United States Patent
Klemm et al.

(10) Patent No.: US 11,619,528 B2
(45) Date of Patent: Apr. 4, 2023

(54) ULTRASONIC FLOW MEASURING DEVICE HAVING A WALL THICKNESS BEING LESS IN THE AREA OF THE PHASED ARRAY ULTRASONIC TRANSDUCER CONTACT AREA

(71) Applicant: SICK ENGINEERING GMBH, Ottendorf-Okrilla (DE)

(72) Inventors: Markus Klemm, Ottendorf-Okrilla (DE); Christian Schulz, Ottendorf-Okrilla (DE); Eric Starke, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 234 days.

(21) Appl. No.: 17/151,524

(22) Filed: Jan. 18, 2021

(65) Prior Publication Data
US 2021/0223078 A1    Jul. 22, 2021

(30) Foreign Application Priority Data
Jan. 21, 2020  (EP) .................................. 20152982

(51) Int. Cl.
*G01F 1/66*  (2022.01)
*G01F 1/667*  (2022.01)

(52) U.S. Cl.
CPC .............. *G01F 1/667* (2013.01); *G01F 1/662* (2013.01)

(58) Field of Classification Search
None
See application file for complete search history.

(56) References Cited

U.S. PATENT DOCUMENTS

| 4,467,659 A | 8/1984 | Baumoel |
| 5,090,252 A * | 2/1992 | Tschirner ................ G01F 1/662 |
| | | 73/861.28 |

(Continued)

FOREIGN PATENT DOCUMENTS

| DE | 102013101950 A1 | 11/2013 |
| EP | 2103912 A1 | 9/2009 |

(Continued)

OTHER PUBLICATIONS

European Search Report dated Jul. 10, 2020 issued in corresponding European Application No. 20152982.3.

(Continued)

*Primary Examiner* — Harshad R Patel
(74) *Attorney, Agent, or Firm* — Nath, Goldberg & Meyer; Jerald L. Meyer

(57) ABSTRACT

Flow velocity of a fluid is measured using a measuring sensor comprising a conduit with a conduit wall, and at least two ultrasonic transducer units (20, 22), each of which consists of an array of individual ultrasonic transducers (30-x, 32-x) and defining a measuring path (24) between them in the conduit (14). The ultrasonic transducer units emit ultrasonic signals and received ultrasonic signals are evaluated to determine the flow velocity. The individual ultrasonic transducers are driven with different phase, so that the ultrasonic transducer units provide a phased array. In order to achieve the most accurate measurement results possible, the ultrasonic transducer units contact the outside of the conduit wall (16), and the conduit wall (16) is formed in the area of the contact with a wall thickness (w) that is less than half the wavelength of the transverse wave ($\lambda_{Rohr}$) of the ultrasound in the conduit wall.

14 Claims, 2 Drawing Sheets

(56) References Cited

U.S. PATENT DOCUMENTS

| | | | |
|---|---|---|---|
| 2015/0020608 A1* | 1/2015 | Chevrier | H02H 9/005 |
| | | | 73/861.31 |
| 2015/0177036 A1* | 6/2015 | Speidel | G01F 1/667 |
| | | | 73/861.27 |
| 2015/0211905 A1* | 7/2015 | Drachmann | G01F 1/662 |
| | | | 73/861.28 |
| 2017/0016750 A1* | 1/2017 | Edward | G01F 1/662 |

FOREIGN PATENT DOCUMENTS

| | | |
|---|---|---|
| EP | 2154491 A1 | 2/2010 |
| EP | 3521773 A1 | 8/2019 |
| EP | 3564631 A1 | 11/2019 |
| WO | 2015/096901 A1 | 7/2015 |

OTHER PUBLICATIONS

Lanoir, et al., "Study of Lamb Waves Based Upon the Frequency and Angular Derivatives of the Phase of the Reflection Coefficient", The Journal of the Acoustical of Physics for the Acoustical Society of America, Bd. 94, No. 1, 1993.

Kang, et al., "Two-Dimensional Flexural Ultrasonic Phased Array for Flow Measurement", IEEE International Ultrasonics Symposium (IUS), Washington, DC, 2017.

* cited by examiner

US 11,619,528 B2

ULTRASONIC FLOW MEASURING DEVICE HAVING A WALL THICKNESS BEING LESS IN THE AREA OF THE PHASED ARRAY ULTRASONIC TRANSDUCER CONTACT AREA

FIELD

The invention relates to a device for measuring the flow velocity of a fluid on an ultrasonic basis.

BACKGROUND

Different measuring principles are known for the determination of flow velocity or flow rate on ultrasonic basis. In a Doppler method, the frequency shift of an ultrasonic signal reflected within the flowing fluid, which shift varies according to the flow velocity, is evaluated. In a differential transit time method, a pair of ultrasonic transducers is mounted face to face on the outer circumference of the pipeline or conduit with a mutual offset in the longitudinal direction. These transducers alternately emit and receive ultrasonic signals transversely to the flow along the measuring path spanned between the ultrasonic transducers. The ultrasonic signals transported through the fluid are accelerated or decelerated by the flow, depending on the direction of travel. The resulting transit time difference is measured and accounted with geometrical quantities to an average flow velocity of the fluid. With the cross-sectional area, this results in the volume flow or flow rate. For more precise measurements, several measuring paths with one pair of ultrasonic transducers each can be provided to measure a flow cross-section at more than one point in the cross-section. For a high measuring accuracy in case of asymmetrical velocity distributions over the flow cross-section, several measuring paths are required which do not run through the conduit axis, so-called non-diametral measuring paths or secant paths. In particular, far off-center secant paths are desirable for a high insensitivity of the volume flow measurement to inhomogeneous flow distributions.

Before going into further details of known techniques and then the invention, it is helpful to clearly describe the geometric conditions and especially the designation of the angles in the case of secant paths. This is done by means of FIG. 1 to 3, of which FIGS. 1 and 2 represent projections in certain sectional planes and FIG. 3 is a 3D representation. In the projections, the angles cannot be clearly shown. Together with the 3D sketch in FIG. 3, however, it is clear. In the figures a pipeline or conduit 14 with a first ultrasonic transducer 20 and a second ultrasonic transducer 22 are shown very schematically, defining a secant path 21. The longitudinal axis of the conduit lies in z and y defines the height and x the width. Then α is the path angle,
γ the angle of radiation,
β the secant angle,
of the secant path 21.

The ultrasonic transducers used to generate the ultrasound have an oscillating body, often a ceramic. With its help an electrical signal is converted into ultrasound and vice versa based for example on the piezoelectric effect. Depending on the application, the ultrasonic transducer works as a sound emitter, sound receiver or both. A coupling between the fluid and the ultrasonic transducer must be provided. A common solution is to let the ultrasonic transducer protrude into the conduit with direct contact to the fluid. Such intrusive probes can make accurate measurements difficult due to disturbance of the flow. Conversely, the immersed ultrasonic transducers are exposed to the fluid with its pressure and temperature and may be damaged or lose their function due to deposits.

In principle, techniques are also known in which the inner wall remains completely closed. One example is the so-called clamp-on mounting, for example in accordance with U.S. Pat. No. 4,467,659, with which ultrasonic transducers are attached to the pipe from outside. However, this only allows diametrical measurement paths through the pipe axis, which generates additional errors in the case of non-axially symmetrical flow profiles.

A further embodiment is presented in DE 10 2013 101 950 A1, in which the ultrasonic units themselves consist of groups of several individual transducers. These can be integrated directly into the pipe wall in the case of multilayer pipe walls, e.g. made of fiber composites. The functional principle uses the transducer groups to emit or receive ultrasound in a targeted manner by means of structure-borne sound waves, as in classical clamp-on arrangements. This has the advantage, as known from so-called clamp-on constructions, in which the ultrasonic transducers are mounted on the outside of the channel wall, that the transducer unit does not protrude into the flow channel and thus the flow is not disturbed and no contamination can occur. A disadvantage is that the production of such measuring devices with integrated transducers is very complex and cost-intensive. For integration into the duct wall, the duct wall must be specially manufactured, for example in several layers, and cannot be made of commercially available materials such as steel. Such measuring devices can therefore not be manufactured as precisely as those made of steel. Precision is, however, a prerequisite for these measuring devices, which have to provide highly precise measurement results, since in many applications very large quantities of fluid (e.g. natural gas) flow through the measuring device and therefore even slightly inaccurate measurement results can mean very high fluctuations in monetary value in a final invoice.

In WO 2015 096 901 A1 a system with clamp-on-mounting is proposed that can also use secant paths, the position being limited by the pipe material used and the fluid to be measured. Due to the transition from the channel wall to the fluid the ultrasound is radiated at a fixed angle γ which is determined by the ratio of the phase velocity $c_P$ of the structure-borne sound waves propagating along the channel wall and the speed of sound in the fluid $c_F$.

$$\sin(\gamma) = \frac{c_F}{c_P} \quad (1)$$

According to the relation $$\tan^2 \gamma = \tan^2 \beta + \cot^2 \alpha \quad (2)$$

the angle γ is divided into the path angle α (preferably smaller than 45°) responsible for the measuring effect and the secant angle β (preferably larger than 20°) responsible for the flow profile sensitivity. This means that the angles α and β for the flow measurement cannot be optimized independently of each other. Especially for the practically relevant case of metallic pipes and liquid media with typical speeds of sound of $c_F$=[1200 . . . 1800] m/s, the achievable accuracy of volume flow measurement with disturbed flow profiles is limited.

A further disadvantage of known intrusive probes occurs at high flow velocities. This is illustrated in EP 2 103 912 A1 in FIGS. 3 and 4. Due to the drift effect, the ultrasonic wave packet hits different points on the opposite pipe wall depending on the flow velocity and may no longer hit the ultrasonic transducer unit located there.

From Kang et al "Two-dimensional flexural ultrasonic phased array for flow measurement" in 2017 IEEE International Ultrasonics Symposium (IUS), Washington, D.C., USA, 6-9 Sep. 2017, published in: 2017 IEEE International: Ultrasonics Symposium (IUS) ISSN 1948-5727, it is known to counteract the above-mentioned drift effect by so-called "phased array beam steering". A "phased array" consists of individual ultrasound transducers which together in superposition emit ultrasound signals. The direction of emission can be changed by changing the individual phases of the individual ultrasound transducers. These "phased array" ultrasonic transducer units are inserted into openings of a flow channel and therefore have the disadvantage of ultrasonic transducers inserted into the pipe wall, namely disturbance of the flow, even if such transducers only slightly protrude into the flow. Furthermore, a contamination problem, especially in the unavoidable gap between the ultrasonic transducer unit and the pipe wall, cannot be avoided.

All state of the art solutions with closed conduit wall have the disadvantage that very off-center secant paths, i.e. those with small path angle ($\alpha$) and large secant angle ($\beta$), are not possible.

SUMMARY

Based on this state of the art, the object of the inventive subject matter is to provide an improved device for measuring the flow velocity of a fluid, with which in particular the aforementioned disadvantages can be avoided, i.e. to provide a high measuring accuracy with good signal quality.

This object is solved by a device comprising
- a measuring sensor with a conduit for the fluid with a conduit wall,
- at least two ultrasonic transducer units, each consisting of an array of individual ultrasonic transducers and defining a measuring path in the conduit between them,
- a control and evaluation unit for controlling the ultrasonic transducer units for emitting ultrasonic signals and for evaluating received ultrasonic signals and determining the flow velocity,
- the control and evaluation unit is designed to drive the individual ultrasonic transducers with different phases, so that the ultrasonic transducer units are each designed as a phased array.

According to the inventive subject matter, the ultrasonic transducer units contact the outside of the conduit wall, whereby the conduit wall in the area of contact is formed with a wall thickness that is less than half the wavelength of the transverse wave of the ultrasound in the conduit wall.

A first advantage is that the conduit wall remains unaffected at least on the inside and therefore neither the flow is impaired, i.e. the flow profile remains undisturbed, nor can contaminants be deposited. No problems with corrosive, acid or otherwise aggressive media can occur. The device according to the inventive subject matter is therefore suitable for all fluids. Nevertheless, the ultrasonic transducers are not, as in DE 10 2013 101 950 A1, elaborately integrated into the wall, but simply contact it from the outside.

The particular advantage of the invention is that the wall thickness dimensioned in accordance with the invention allows particularly large secant angles and/or small path angles to be achieved. Thus, very off-center secant paths can be realized, which, as described at the beginning, allow a higher measurement accuracy.

The invention offers the further advantage that one and the same device is suitable for a large variety of different fluids under a wide range of conditions. Each fluid has its individual speed of sound, which also depends on the environmental conditions, such as temperature and pressure. A specific control of the individual transducers results in a specific radiation characteristic for a certain speed of sound. By controlling the phases, however, the directional characteristic of the ultrasonic transducers can now be adjusted as a function of the speed of sound. Thus, the ultrasonic signals of one transducer unit can be directed much more precisely to the other transducer unit under changing environmental conditions. All in all, the device according to the inventive subject matter is more universally applicable and at the same time provides improved measurement results.

In a preferred design, the wall thickness in the area of the contact is less than a quarter of the wavelength of the transverse wave of the ultrasound in the conduit wall. This allows the beam angle and thus the measuring accuracy to be further increased.

This advantage is also achieved by the fact that the dimensions of the individual ultrasonic transducers parallel to the conduit wall are smaller than the ultrasonic wavelength in the fluid and preferably smaller than 0.6 times the ultrasonic wavelength.

In an embodiment, the dimensions of the ultrasonic transducer units parallel to the conduit wall are larger than twice the ultrasonic wavelength in the fluid in order to be able to emit a sufficiently large ultrasonic packet, i.e. with a sufficient intensity. Sufficient means that the ultrasonic transducer unit—opposite each other receives the ultrasonic packet with an intensity sufficient for reception and evaluation.

In a further embodiment, at least one of the measuring paths has a secant angle of more than 20°, preferably more than 30°. This allows measuring paths to be placed as close as possible to the conduit wall, which results in a higher resistance to interference and thus more accurate measured values.

In one embodiment of the inventive subject matter, the array is a linear array consisting of one line whose alignment is parallel to the measurement path.

In a further embodiment, the array may also be two-dimensional, with the individual ultrasonic transducers preferably arranged in rows and columns. This makes it possible to counteract the drift effect by controlling the ultrasonic transducers with respect to their phase and thus tracking the beam angle accordingly. Thus, better measurement results can be obtained over a wide range of flow velocities. The phased-array ultrasonic transducer unit can then compensate the drift effect online and adjust the direction of the radiation of the ultrasonic packets to the flow velocity.

In a structurally simple manner, the area of contact with the thin conduit wall according to the inventive subject matter is preferably formed by a recess in the exterior of the conduit wall, whereby the dimensions of the recess are adapted to the array. In this way, the thinned wall area can be kept as small as possible so that the mechanical stability of the conduit is affected by the thinning as little as possible.

In order to prevent the perturbing cross-talk by structure-borne sound, which can be transmitted via the conduit wall, the ultrasonic transducers are coupled with a structure-borne sound filter in further embodiment.

In a further embodiment of the invention, the ultrasonic transducers located at the edge of the array are controllable in such a way that active structure-borne sound is suppressed. Thus, ultrasound at the edge of the array can be eliminated by interference, so that the edge of the array does not radiate and thus cannot couple into the conduit wall. This prevents or at least reduces structure-borne noise at the point of origin.

Preferably, the ultrasonic transducers are glued or pressed to the conduit wall in the thinned area of the wall in a simple way.

BRIEF DESCRIPTION OF THE DRAWINGS

In the following, the invention is described in detail by means of preferred embodiments with reference to the drawing. In the drawing the figures show.

DETAILED DESCRIPTION

Figure 1:
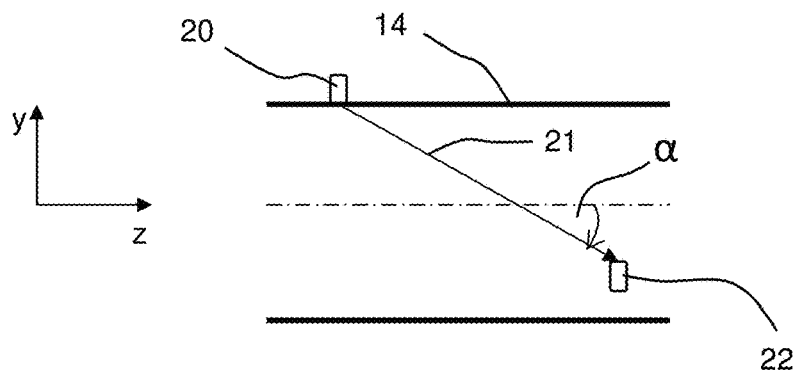
FIG. 1 to 3 a schematic representation with a measuring path in a conduit to illustrate the individual angle definitions.
Figure 2:
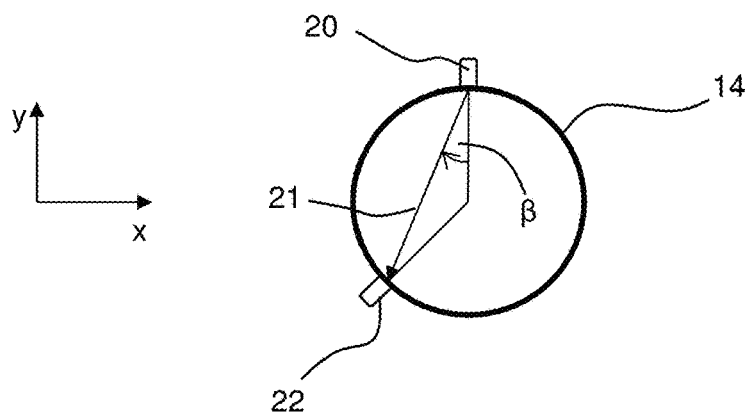
Figure 3:
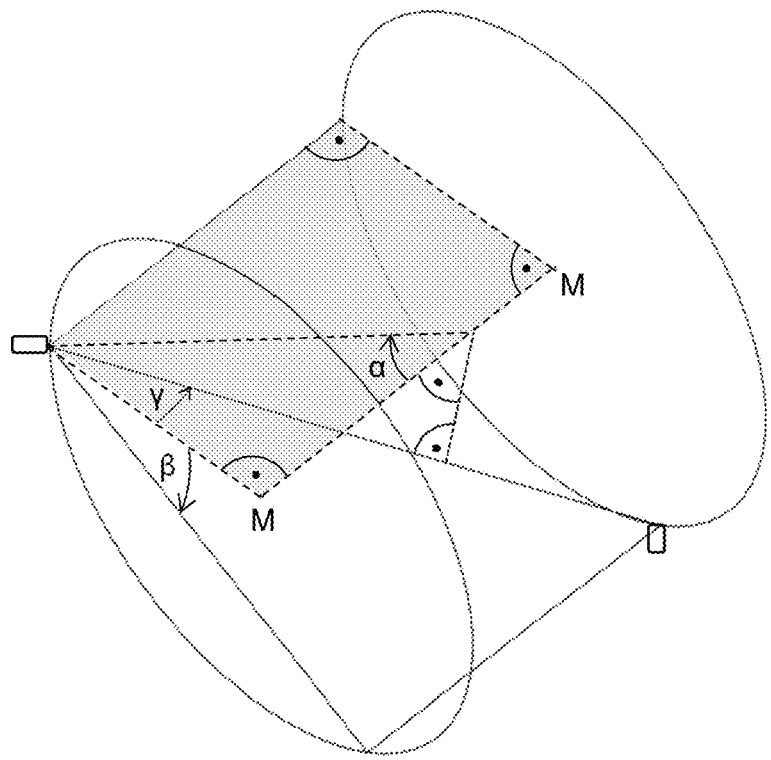

A device 10 according to the inventive subject matter comprises a measuring sensor 12, which has a conduit 14 for the fluid with a conduit wall 16. The fluid, a gas or liquid, flowing through the conduit 14 is shown in FIG. 4 with a wide arrow 18.

Figure 4:
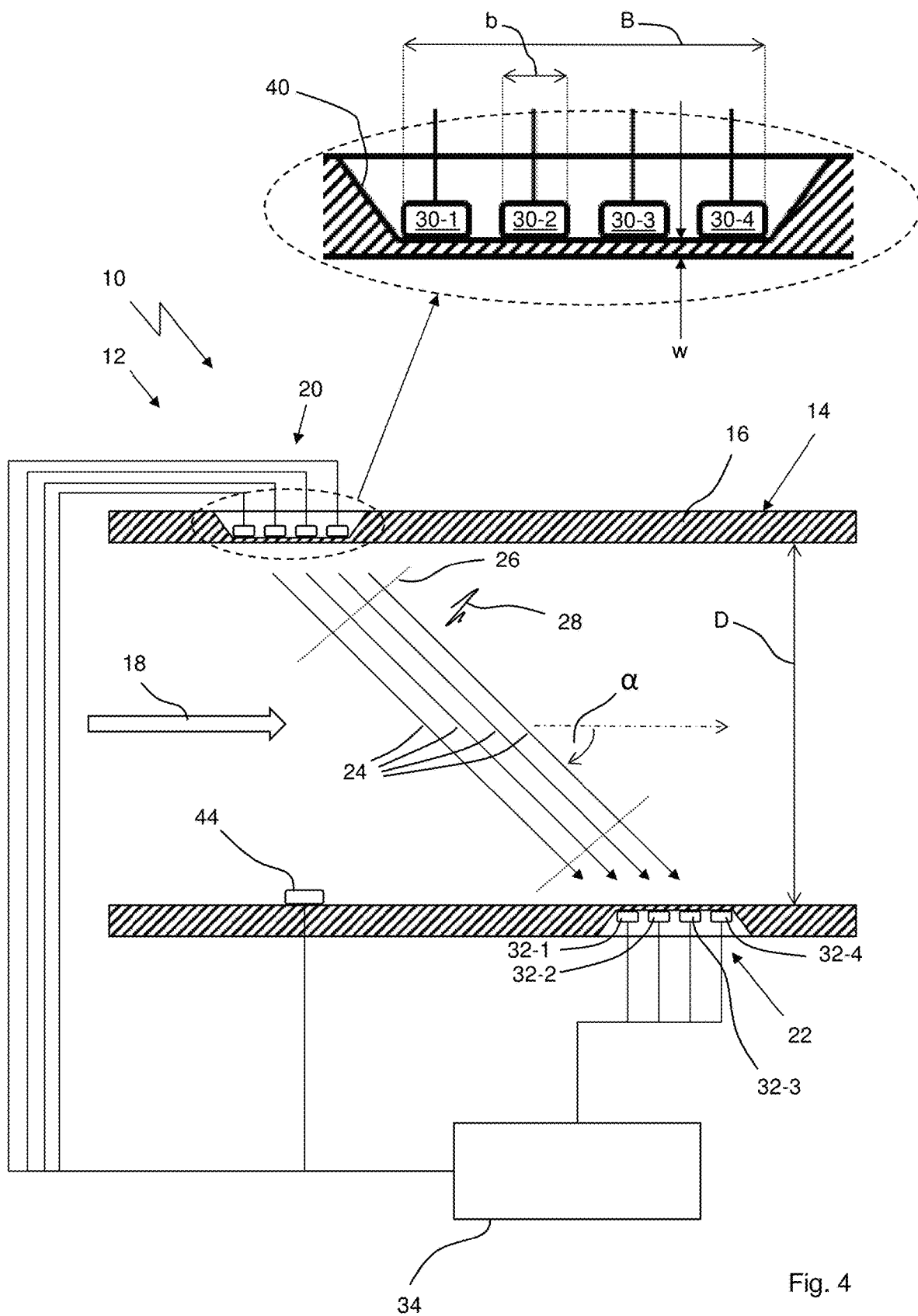
FIG. 4 a schematic representation of a device according to the inventive subject matter.

Furthermore, the device 10 has at least two ultrasonic transducer units 20 and 22, which define a measuring path 24 between them in the conduit 14, which is indicated by arrows 24 in FIG. 4. The measuring path 24 is shown in FIG. 4 as a diametrical path for easier visualization. It can also be designed as a secant path. Secant paths are the actual target of the invention. As known from the state of the art and described above, the ultrasonic transducer units 20 and 22 are arranged with a mutual offset in flow direction 18. This means that the measuring path 24 is not orthogonal to the flow direction 18. Each of the ultrasonic transducer units 20 and 22 can operate as a transmitter or receiver.

From the path angle α and the distance D to the opposite channel wall, with a round conduit 14 and diametrical measuring path that would be the conduit diameter, the length L of the measuring path 24 in the fluid medium results. Ultrasonic signals 28, which are emitted and received on the measuring path 24 in opposite directions, thus have one component in the direction of the flow direction 18 and another component in the opposite direction of the flow direction 18. The ultrasonic signals 28 are emitted in pulsed form as ultrasonic wave packets 28 to determine the flow velocity v of the fluid 18 as in the state of the art according to the transit time method by the relation $$v = \frac{t_2 - t_1}{2 * t_2 * t_1} * \frac{L}{\cos(\alpha)} \quad (3)$$

where $t_2$ and $t_1$ denote the sound travel times required by the radiated ultrasonic wave packets 28 to travel the measurement path 24 upstream and downstream, respectively.

An ultrasonic transducer unit 20 or 22 consists of a group (array) of individual ultrasonic transducers 30-x or 32-x. The "x" in the reference number stands for a running index for each individual transducer. In the drawing only four ultrasonic transducers 30-1 to 30-4 or 32-1 to 32-4 are shown in one row.

The individual ultrasonic transducers 30-x or 32-x are controlled by an electronic control and evaluation unit 34 to emit ultrasound in such a way that they have a phase offset within their row. The phase offset is selected in such a way that the superposition of the resulting ultrasonic waves results in the ultrasonic wave packet 28 with a wave front 26 with the path angle α. The ultrasonic transducers 30-x or 32-x of an ultrasonic transducer unit 20 or 22 are thus constructed as a phased array.

The electronic control and evaluation unit 34 has electronic components (not shown), like resistors, capacitors, memories and integrated circuits and the like, preferably placed on a circuit board.

In order for the ultrasonic transducers 30-x or 32-x to emit ultrasound at all through the conduit wall 16 in the described manner, the ultrasonic transducers 30-x or 32-x contact the conduit wall 16 on the outside. In contrast to known clamp-on systems, however, the conduit wall 16 is now formed in the area of the contact with a wall thickness w which is less than half, preferably less than a quarter, of the wavelength $\lambda_{pipe}$ of the transverse wave of the ultrasound in the conduit wall 16. In the case of a typical conduit wall made of steel with a typical speed of sound of the transverse wave of $c_{L,pipe}=3100$ m/s, the wall thickness w would be about 0.78 mm at a typical ultrasonic frequency of f=1 MHz, corresponding to a quarter of the wavelength.

The control and evaluation unit 34 controls the individual ultrasonic transducers 30-x and 32-x. This applies both to the transmission of ultrasound with the individual control with corresponding phase and to the reception with the evaluation of the incoming ultrasound wave packet 28 at each transducer. In particular, the evaluation unit 34 determines the transit time t of the ultrasonic wave packets 28, which are transmitted in one or the opposite direction along the measuring path 24. The flow velocity v is calculated from the transit times $t_1$ and $t_2$ of outgoing and returning ultrasonic wave packets 28 according to equation (3).

Due to the inventive design of the ultrasonic transducer units 20 or 22 as phased array, the angle of radiation γ depends on the phase shift of the individual signals and on the speed of sound in the fluid. The speed of sound itself depends on environmental conditions such as temperature and pressure. It is therefore advantageous that by controlling the individual ultrasonic transducers 30-x or 32-x by means of the control and evaluation unit 34, the phase difference can be adjusted depending on the ambient conditions in such a way that the angle of radiation γ remains the same, even if the speed of sound changes. To determine the ambient conditions, an environmental detection unit 44 can be provided, which detects e.g. temperature and/or pressure in the conduit 14 and transmits it to the control and evaluation unit 34 to monitor the fluid properties and thus be able to calculate the speed of sound and density. With this knowledge, the ultrasonic transducers 30-x or 32-x can be controlled or evaluated better. The density is necessary to calculate the mass flow and can be calculated from the properties of the medium as well as temperature and pressure.

In this way the device 10 in accordance with the inventive subject matter can be used for a wide range of the speed of sound.

In one embodiment of the invention, the dimensions b of the individual ultrasonic transducers 30-x or 32-x parallel to the conduit wall 16 are smaller than the ultrasonic wavelength $\lambda_{fluid}$ in the fluid and preferably smaller than 0.6 times the ultrasonic wavelength $\lambda_{fluid}$.

Advantageously, the dimensions B of the ultrasonic transducer units 20 or 22 parallel to the conduit wall 16 are larger than twice the ultrasonic wavelength $\lambda_{fluid}$ in the fluid.

The area of contact, i.e. the area of thinned wall thickness, is formed as shown in FIG. 4 by a recess 40, which is inserted into the conduit wall 16 from the outside. The shape of the recess is sensibly adapted to the array in its dimensions.

In the embodiment shown in FIG. 4, the arrayed ultrasonic transducer units 20 and 22 consist of a line of only four ultrasonic transducers 30-x and 32-x respectively. This limitation is mainly due to the fact that the drawing should remain simple and clear. If four of such single transducers do not provide enough signal, the array may have more, for example eight, transducers. Therefore, the array is preferably designed with more transducers. The number of ultrasonic transducers is a compromise between signal strength, complexity and cost.

If the array is a two-dimensional array with arrangement of the ultrasonic transducers 30-x or 32-x in rows and columns, then the beam angle γ can be changed by controlling the individual ultrasonic transducers 30-x or 32-x by means of the control and evaluation unit 34. This can counteract a drift effect, especially at high fluid flow velocities. The radiation angle γ can be adjusted so that the opposite ultrasonic transducer unit 20 or 22 is always "hit" by the emitted wave packet 28, regardless of the flow velocity.

The ultrasonic transducers 30-x or 32-x of an ultrasonic transducer unit 20 or 22 are coupled with a structure-borne sound filter in a way not shown here, wherein the coupling can be realized by gluing or pressing the transducers onto the wall.

In a further embodiment of the invention, the control and evaluation unit 34 is designed to control the ultrasonic transducers located at the edge of the array (in FIG. 4 these would be 30-1 and 30-4 or 32-1 and 32-4) in such a way that active structure-borne sound suppression takes place, i.e. that lateral vibration components are eliminated by interference with the ultrasound generated by the edge, so that the edge of the array transmits effectively as little vibration as possible laterally into the conduit wall.

Thus, coupling of ultrasound into the conduit wall 16 can at least be reduced, if not prevented.

The above description is based on a diametric measurement path 24 for the sake of simplicity, because the construction details are independent of whether the path is diametric or secant. It should be repeated, however, that the object of the invention is to achieve secant paths 21 and in particular very off-center secant paths, which is only possible in the version according to the inventive subject matter. Preferably, the control of the ultrasonic transducers 30-x or 32-x is such that at least one of the measuring paths has a secant angle greater than 20°, preferably greater than 30°. As mentioned above, secant paths and especially the consideration of secant paths located far outside of the measuring range lead to a higher resistance of the result against perturbations and thus to more accurate measurement values.

The invention claimed is:

1. Device for measuring the flow velocity of a fluid (18) having
a measuring sensor (12) which has a conduit (14) for the fluid (18) with a conduit wall (16),
at least two ultrasonic transducer units (20, 22), each consisting of an array of individual ultrasonic transducers (30-x, 32-x) and defining a measuring path (24) in the conduit (14) between them,
a control and evaluation unit (34) for controlling the ultrasonic transducer units (20, 22) for transmitting ultrasonic signals (28) and for evaluating received ultrasonic signals (28) and determining the flow velocity (v), and
the control and evaluation unit (34) is designed to drive the individual ultrasonic transducers (30-x, 32-x) with different phases, so that the ultrasonic transducer units (20, 22) are each designed as a phased array,
characterized in that
the ultrasonic transducer units (20, 22) contact the outside of the pipe conduit wall (16),
the measuring path (24) is formed as a secant path (21) and does not lie diametrically, and
wherein the conduit wall (16) is formed in the area of the contact with a wall thickness (w) that is less than half the wavelength of the transverse wave (λpipe) of the ultrasound in the conduit wall (16).

2. Device according to claim 1, characterized in that the wall thickness in the area of the contacting is less than a quarter of the wavelength of the transverse wave (λpipe) of the ultrasound in the conduit wall (16).

3. Device according to claim 1, characterized in that the dimensions of the ultrasonic transducers (30-x, 32-x) parallel to the conduit wall (16) are smaller than the ultrasonic wavelength in the fluid.

4. Device according to claim 1, characterized in that the dimensions of the ultrasonic transducer units (20,22) parallel to the conduit wall (16) are greater than twice the ultrasonic wavelength in the fluid.

5. Device according to claim 1, characterized in that at least one of the measuring paths has a secant angle of greater than 20°.

6. Device according to claim 1, characterized in that the array is a linear array and consists of one line.

7. Device according to claim 1, characterized in that the array is two-dimensional.

8. Device according to claim 1, characterized in that the area of the contacting is formed by a recess in the exterior of the conduit wall (16), the dimensions of the recess being adapted to the array.

9. Device according to claim 1, characterized in that the ultrasonic transducers are coupled to a structure-borne sound filter.

10. Device according to claim 1, characterized in that the ultrasonic transducers are glued or pressed to the conduit wall (16).

11. Device according to claim 1, characterized in that at least one of the measuring paths has a secant angle of greater than 30°.

12. Device according to claim 1, characterized in that the array is two-dimensional and the individual ultrasonic transducers are arranged in rows and columns.

13. Device for measuring the flow velocity of a fluid (18) having
a measuring sensor (12) which has a conduit (14) for the fluid (18) with a conduit wall (16),
at least two ultrasonic transducer units (20, 22), the ultrasonic transducers glued or pressed to the conduit wall (16), each transducer consisting of an array of individual ultrasonic transducers (30-x, 32-x) and defining a measuring path (24) in the conduit (14) between them, and
a control and evaluation unit (34) for controlling the ultrasonic transducer units (20, 22) for transmitting ultrasonic signals (28) and for evaluating received ultrasonic signals (28) and determining the flow velocity (v), the control and evaluation unit (34) designed to drive the individual ultrasonic transducers (30-x, 32-x)

with different phases, so that the ultrasonic transducer units (20, 22) are each designed as a phased array, wherein the ultrasonic transducer units (20, 22) contact the outside of the conduit wall (16), wherein the conduit wall (16) is formed in the area of the contact with a wall thickness (w) that is less than half the wavelength of the transverse wave ($\lambda$pipe) of the ultrasound in the conduit wall (16), and wherein the control and evaluation unit is designed in such a way that the ultrasonic transducers located at the edge of the array can be controlled in such a way that active structure-borne sound suppression is thereby achieved.

14. Device for measuring the flow velocity of a fluid (18) having a measuring sensor (12) which has a conduit (14) for the fluid (18) with a conduit wall (16), at least two ultrasonic transducer units (20, 22), the ultrasonic transducers glued or pressed to the conduit wall (16), each transducer consisting of an array of individual ultrasonic transducers (30-x, 32-x) and defining a measuring path (24) in the conduit (14) between them, and a control and evaluation unit (34) for controlling the ultrasonic transducer units (20, 22) for transmitting ultrasonic signals (28) and for evaluating received ultrasonic signals (28) and determining the flow velocity (v), the control and evaluation unit (34) designed to drive the individual ultrasonic transducers (30-x, 32-x) with different phases, so that the ultrasonic transducer units (20, 22) are each designed as a phased array, wherein the ultrasonic transducer units (20, 22) contact the outside of the conduit wall (16), wherein the conduit wall (16) is formed in the area of the contact with a wall thickness (w) that is less than half the wavelength of the transverse wave ($\lambda$pipe) of the ultrasound in the conduit wall (16), and wherein the control and evaluation unit is designed such that the control of the ultrasonic transducers with respect to their phase for each ultrasonic transducer is dependent on the speed of sound in the fluid.

* * * * *